United States Patent [19]

Steiner et al.

[11] 4,328,201

[45] May 4, 1982

[54] REDUCTION OF SULFUR DIOXIDE WITH RECYCLED COAL

[75] Inventors: Peter Steiner; Carl Gutterman, both of Edison, N.J.; Stuart M. Dalton, Menlo Park, Calif.

[73] Assignee: Electric Power Research Institute, Inc., Palo Alto, Calif.

[21] Appl. No.: 209,353

[22] Filed: Nov. 24, 1980

[51] Int. Cl.$^3$ ............................................... C01B 17/04
[52] U.S. Cl. ................................................... 423/569
[58] Field of Search ........................... 423/567 A, 569

[56] References Cited

U.S. PATENT DOCUMENTS

| | | | |
|---|---|---|---|
| 4,095,953 | 6/1978 | Gutterman et al. | 423/569 X |
| 4,147,762 | 4/1979 | Steiner | 423/569 |
| 4,164,555 | 8/1979 | Steiner | 423/569 |

*Primary Examiner*—G. O. Peters
*Attorney, Agent, or Firm*—Marvin A. Naigur; John E. Wilson; Robert D. Bajefsky

[57] ABSTRACT

A process for removing sulfur dioxide from an off-gas and converting it to elemental sulfur wherein steam is introduced into a sulfur dioxide-containing off-gas, and the composite is passed through a reactor containing a mixture of fresh and recycled coal.

13 Claims, 1 Drawing Figure

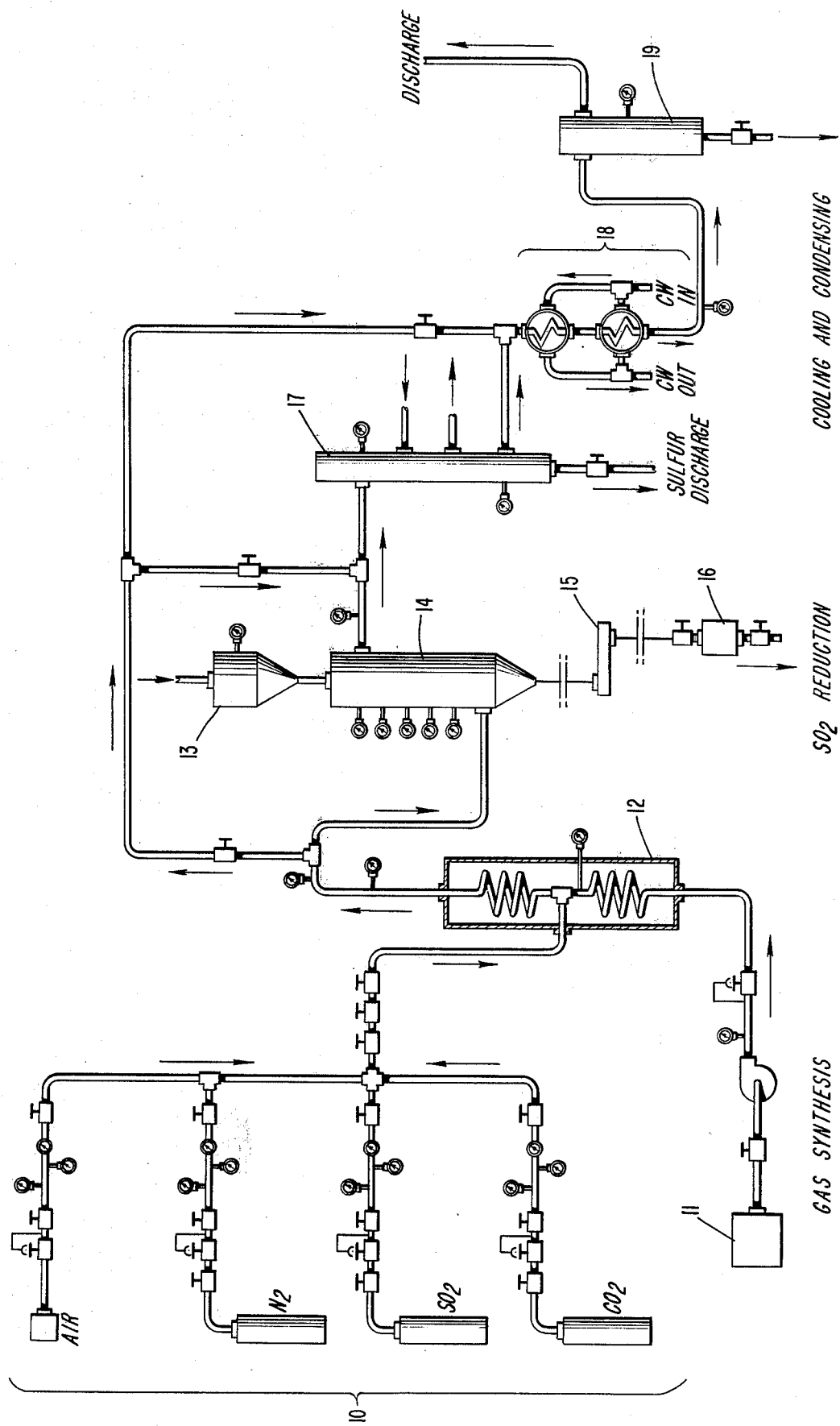

REDUCTION OF SULFUR DIOXIDE WITH RECYCLED COAL

BACKGROUND OF THE INVENTION

Prior art processes exist for the removal of sulfur dioxide ($SO_2$) from polluted gas streams. These processes yield a concentrated $SO_2$ off-gas. Such a process is described in Steiner et al, *Removal and Reduction of Sulfur Dioxides from Polluted Gas Streams,* 15 American Chemical Society's Advances in Chemistry Series, No. 139, at 180 (1975). The present invention relates to the removal of $SO_2$ from an $SO_2$-containing off-gas, and its conversion to elemental sulfur.

In U.S. Pat. No. 4,147,762 (hereafter the "762 patent"), a process is described for removing $SO_2$ from $SO_2$-containing off-gas and converting it to elemental sulfur. More specifically, steam is introduced into $SO_2$-containing off-gas and the composite is passed through a reactor containing coal. The process described in the 762 patent has two significant advantages: (1) relatively inexpensive high sulfur coal can be used as the reducing agent; and (2) the conversion reaction can be conducted at temperatures that are substantially lower than those required in previously known processes. Notwithstanding these advantages, the process of the 762 patent has two significant problems: (1) the utilization of carbon, the reducing agent, is low; and (2) the yield of elemental sulfur, at high percentages of $SO_2$ removal, is low, with the concomitant production of undesirable by-products such as $H_2S$, $COS$, and $CS_2$.

SUMMARY OF THE INVENTION

The present invention overcomes the above-described problems encountered in the 762 patent, as well as having certain additional advantages that will be discussed hereinbelow.

In accordance with the present invention, steam and a $SO_2$-containing off-gas are introduced into a reactor containing a mixture of fresh and recycled coal, with the temperature of the reactor being maintained at a level sufficient to reduce the sulfur dioxide to elemental sulfur. While the amount of recycled coal, as a percentage of the total coal fed to the reactor, can vary widely, preferably from 30% to 90% of the coal fed to the reactor is recycled. More preferably, from 50% to 80% of the coal mixture is recycled coal.

In a preferred embodiment of the present invention, granular coal, which is first screened to remove fines, preferably with a No. 6 square sieve size (3.35 mm), is gravity fed into the reactor, with the flow of coal moving countercurrent to the flow of steam and $SO_2$-containing off-gas. The elemental sulfur that is removed from the reactor can be condensed. Preferably, the minimum reactor temperature ranges from 779° F. to 1232° F., whereas the maximum reactor temperature ranges from 1231° F. to 1470° F., and the contact time between the steam and $SO_2$-containing off-gas and the coal is preferably from 5.8 to 13.4 seconds.

As a result of using recycled coal in accordance with the present invention, there is a significant increase in the yield of elemental sulfur at high percentages of $SO_2$ conversion. By use of the present invention, for a fixed load, the percent conversion of $SO_2$ can be expected to range from 85.3% to 93.9%, while the yield of elemental sulfur, as a weight percent of the total sulfur content of the gas feed, can be expected to range from 78.3% to 85.8%. In comparison, when no recycled coal is used the yield of elemental sulfur was 70.0% when the percent removal of $SO_2$ was 84.4%.

The increase in the yield of elemental sulfur is advantageously accompanied by a reduction in cost of both raw materials and capital equipment. Specifically, the requirement for fresh coal is most preferably reduced by 50% to 80%, and the increased yield enables selective equipment to be reduced in size.

Aside from increasing the yield of elemental sulfur, the use of recycled coal advantageously reduces the amount of undesired by-products such as $H_2S$, $COS$, and $CS_2$. This appears to result from the lower volatile content of recycled coal, as well as the suppressing effect on side reactions resulting from the use of a less reactive reducing agent. Moreover, the lower reactivity of the recycled coal advantageously results in a more controllable process.

An additional advantage of the present invention is that the purity of the elemental sulfur produced is increased. This is due to the lower volatile content of recycled coal and the removal of most fines by screening.

BRIEF DESCRIPTION OF THE DRAWING

The accompanying drawing is a schematic of the pilot plant in which the test runs discussed herein were conducted.

DESCRIPTION OF THE PREFERRED EMBODIMENT

In describing in more detail various preferred embodiments of the present invention, reference will be made to the accompanying drawing which is a schematic of the pilot plant in which test runs of the process of the present invention, as well as of the prior art process, were conducted.

To simulate $SO_2$-containing off-gas, sources 10 of air, nitrogen, sulfur dioxide, and carbon dioxide are provided. As described in the 762 patent, which patent is incorporated herein by reference, steam is mixed with the $SO_2$-containing off-gas thereby permitting the use of lower operating temperatures. In general, the mole ratio of steam and $SO_2$ ranges from 1 mole, preferably upwards of 1 mole, of $H_2O$ per mole of $SO_2$, and more preferably about 3 moles or more of $H_2O$ per mole of $SO_2$. The steam is provided by pumping boiler condensate from a tank 11 to a vaporizing coil in a fired heater 12, where the steam is mixed with the $SO_2$-containing off-gas.

The steam and $SO_2$-containing off-gas enter a lower end of a reactor 14 where the gas flows countercurrent to a downwardly moving supply of coal. Preferably, the contact time between the gas stream and coal ranges from 5.8 to 13.4 seconds. The coal, which is stored in a hopper 13, is gravity fed into the reactor. A vibratory feeder 15 is flanged at its inlet to the reactor 14 and at its outlet to a spent-coal receiver 16. The vibratory feeder 15 uses an external air-driven piston (not shown) to move the coal along horizontal tubing until it falls into the receiver 16.

Temperature sample ports TR are located, at quarter point intervals, along the vertical reactor 14, as well as at the inlet and outlet of the reactor 14. The temperature of the reactor 14 is maintained at a level sufficient to permit the $SO_2$ to be reduced to gaseous elemental sulfur while the carbon content of the coal is oxidized. Preferably, the minimum reactor temperature, which is measured at a point just before the gas disengages from the coal, ranges from 779° F. to 1232° F., while the maximum reactor temperature, which usually occurs at a point ¼ up from the bottom of the bed, ranges from 1231° F. to 1470° F.

The coal that is used in the present invention is a mixture of fresh and recycled coal. As used herein and in the accompanying claims "fresh coal" is defined as coal that has not been in contact with the $SO_2$-containing off-gas, whereas "recycled coal" is defined as coal that has already been in contact with the $SO_2$-containing off-gas.

The percentage of recycled coal in the mixture can vary over a wide range. Preferably, the percentage of recycled coal can range from 30% to 90%, and more preferably from 50% to 80% of the total coal mixture. As established by the examples and Table 4 below, by using a mixture of fresh coal and recycled coal a significant increase in the yield of elemental sulfur can be obtained as compared to using all fresh coal. Moreover, since the recycled coal has a lower volatile content and is a less reactive reducing agent than fresh coal, there is a decrease in the amount of undesired by-products such as $H_2S$, COS, and $CS_2$. In addition, the lower reactivity of the recycled coal results in a more controllable process, thereby allowing for greater variations in operating parameters (e.g., temperature, flow rate, $SO_2$ concentration) without affecting the yield of elemental sulfur.

All the usual types of commercial coal can be employed in the present invention including anthracite, peat, lignite, subbituminous, bituminous, super-bituminous coal, or coke. Preferably, the coal is in granular or particulate form and is screened before being used. Preferably, a No. 6 square sieve size (3.35 mm) is used. In practice, the recycled coal is screened on site, whereas the fresh coal is usually screened at the mine. The removal of fines by screening contributes to the increased purity of the elemental sulfur.

The product gas leaving reactor 14 is cooled and condensed in stages. The sulfur condenser 17 cools the product gas to approximately 300° F., with elemental sulfur being condensed and collected in its receiver. The remainder of the product gas is then cooled in a steam condenser 18 to below 100° F. The condensate is collected in a drum 19, and the remaining relatively dry gas is sampled and its constituents determined.

By use of the present invention, it can be expected that from 85.3% to 93.9% of the $SO_2$ in the treated gas, for a fixed gas load, can be reduced. Moreover, the yield of elemental sulfur, for a fixed load, as a weight percent of the total sulfur in the feed, can be expected to range from 78.3% to 85.8%. The purity of the elemental sulfur obtained can be expected to exceed 99%. This high purity is attributable to both screening of coal fines as well as the lower volatile content of recycled coal.

In the examples that follow, the data was obtained by operating the pilot plant depicted in the accompanying drawing and previously described. The fresh coal used in all the test runs was Sophia Jacoba anthracite coal obtained from West Germany. Its composition is set forth in Table 1.

TABLE 1

| INSPECTION OF SOPHIA JACOBA ANTHRACITE COAL-PROXIMATE, ULTIMATE ANALYSES | | |
|---|---|---|
| | As Received | Dry |
| Proximate Analysis, wt % | | |
| Fixed Carbon | 88.03 | 90.11 |
| Volatile Matter | 6.07 | 6.21 |
| Ash | 3.60 | 3.68 |
| Moisture | 2.30 | — |
| TOTAL | 100.00 | 100.00 |
| Ultimate Analysis, wt % | | |
| Carbon | 88.15 | 90.23 |
| Hydrogen | 3.25 | 3.33 |
| Oxygen | 0.86 | 0.88 |
| Nitrogen | 1.02 | 1.04 |
| Sulfur | 0.82 | 0.84 |
| Ash | 3.60 | 3.68 |
| Moisture | 2.30 | — |
| TOTAL | 100.00 | 100.00 |

A screen analysis of the fresh coal used in the test runs is set forth in Table 2.

TABLE 2

| INSPECTION OF SOPHIA JACOBA ANTHRACITE COAL-SCREEN ANALYSIS | | |
|---|---|---|
| Screen | % On | % Thru |
| Round | | |
| 7.62 cm (3 in.) | — | — |
| 6.35 cm (2½ in.) | — | — |
| 5.08 cm (2 in.) | — | — |
| 3.81 cm (1½ in.) | — | — |
| 3.18 cm (1¼ in.) | — | — |
| 2.54 cm (1 in.) | — | — |
| 1.91 cm (¾ in.) | — | — |
| 1.27 cm (½ in.) | 0.71 | 99.29 |
| 0.95 cm (⅜ in.) | 24.44 | 76.85 |
| Square | | |
| 4.76 mm (No. 4) | 53.83 | 23.02 |
| 3.35 mm (No. 6) | 3.96 | 19.06 |
| 2.38 mm (No. 8) | 3.92 | 15.14 |
| 1.70 mm (No. 12) | 4.28 | 10.86 |
| 1.40 mm (No. 14) | 1.02 | 9.84 |
| 1.19 mm (No. 16) | 2.16 | 7.68 |
| 1.00 mm (No. 18) | 0.71 | 6.97 |
| 850 μm (No. 20) | 1.80 | 5.17 |
| 710 μm (No. 25) | 0.82 | 4.35 |
| 595 μm (No. 30) | 0.71 | 3.64 |
| 297 μm (No. 50) | 1.45 | 2.19 |
| 149 μm (No. 100) | 0.94 | 1.25 |
| 105 μm (No. 140) | 0.31 | 0.94 |
| 74 μm (No. 200) | 0.24 | 0.70 |
| 44 μm (No. 325) | 0.27 | 0.43 |

EXAMPLE 1

This example represents the data base against which the present invention should be compared. Runs 1 and 2 were conducted over a three day period. Only fresh coal was fed to the reactor, with no recycled coal being used. The ash content of the used and unscreened coal at the end of each day was 7.89%, and 5.70% for runs 1 and 2, respectively. The volatile matter present in the used coal from run 1 was 3.65%, as compared to 6.21% for the dry and unused fresh coal. The used coal analysis, as well as the elemental sulfur analysis, for most of the test runs is summarized in Table 3, below. The following is a summary of the results of runs 1 and 2.

| | Run 1 | Run 2 |
|---|---|---|
| Feed Composition-Mole % (wt. %) | | |
| $SO_2$ | 19.1 (37.9) | 19.2 (37.8) |
| $N_2$ | 5.7 (4.9) | 5.7 (4.9) |

|  | Run 1 | Run 2 |
| --- | --- | --- |
| $CO_2$ | 9.5 (12.9) | 9.6 (13.0) |
| $H_2O$ | 42.7 (23.7) | 42.4 (23.6) |
| Control Air | 23.0 (20.6) | 23.1 (20.7) |
| Rate-Sft$^3$/hr. at 60° F. | 223.8 | 222.9 |
| Dry Gaseous Product Composition-Mole % (wt. %) | | |
| $N_2$ | 40.0 (31.2) | 29.9 (24.9) |
| CO | 0.7 (0.55) | 1.9 (1.6) |
| $CH_4$ | 2.0 (0.88) | 2.5 (1.2) |
| $CO_2$ | 42.5 (52.0) | 39.3 (51.4) |
| $C_2H_4$ | 0.0 (0.0) | 0.0 (0.0) |
| $C_2H_6$ | 0.0 (0.0) | 0.0 (0.0) |
| $H_2S$ | 1.6 (1.5) | 11.8 (12.0) |
| COS | 2.4 (4.0) | 3.3 (5.9) |
| $CS_2$ | 0.3 (0.64) | 0.39 (0.89) |
| $H_2$ | 5.5 (0.30) | 10.1 (0.60) |
| $SO_2$ | 5.0 (8.9) | 0.8 (1.5) |
| Rate-Sft$^3$/hr. at 60° F. | 132.5 | 177.3 |
| Reactor Temperature-°F. | | |
| Gas inlet | 1010 | 1072 |
| ¼ Bed | 1303 | 1349 |
| ½ Bed | 1087 | 982 |
| ¾ Bed | 806 | 769 |
| Gas Outlet | 768 | 826 |
| Average Reactor Pressure-kPa absolute (psia) | 115 (16.7) | 115 (16.7) |
| Gas Residence Time-seconds [Based on superficial velocity, average temperature and inlet composition] | 13.1 | 13.1 |
| Coal Discharge Rate-cg/s (lb/hr) | 39.1 (3.1) | 60.5 (4.8) |
| as percent of reactor content/hr | 3.3 | 5.1 |
| Volumetric Expansion-elemental sulfur and moisture-free ratio of gaseous products to feedstock | 1.03 | 1.38 |
| $SO_2$ Conversion (removal)-% | 84.4 | 96.7 |
| Sulfur In Product-as percent of sulfur in Feed | | |
| From $H_2S$ | 5.0 | 49.0 |
| From COS | 7.5 | 13.6 |
| From $SO_2$ | 15.6 | 3.3 |
| From $CS_2$ | 1.9 | 3.3 |
| Elemental Sulfur | 70.0 | 30.8 |
| Rate-cg/s (lb/hr.) | 45.4 (3.60) | 45.4 (3.60) |
| Purity of Elemental Sulfur-% | 97.28 | — |

EXAMPLE 2

The effect of using recycled coal with a gas flow rate at 50% of the maximum flow that the pilot plant is capable of handling was studied in runs 3, 4, 5, and 6 over a five day period. The testing was begun with the reactor filled with partially spent coal from the completion of run 2. The coal hopper had a one-reactor volume reserve of a 1:1 mixture of fresh coal and recycled coal. During the five days of operation, the spent coal was screened through a No. 6 square sieve (3.35 mm) and then recycled through the reactor. This was accomplished by interrupting operations daily and recycling the actual amount of spent coal collected for that day with a sufficient amount of fresh coal to reestablish the same reserve in the coal hopper (approximately one reactor volume) as existed before that days testing. The fresh and recycled coal were well mixed before being charged to the hopper. One operating day was sufficient to displace approximately one reactor volume of coal. An average of 80.6% of the coal fed to the reactor over the five day period was recycled coal. The screened coal used for recycle was analyzed for its ash content and volatile matter. The percentage ash in the recycled coal ranged from 3.65% to 5.18%. The volatile matter in the recycled coal ranged from 1.78% to 3.89%. The following is a summary of the results of runs 3, 4, 5, and 6.

|  | Run 3 | Run 4 | Run 5 | Run 6 |
| --- | --- | --- | --- | --- |
| Feed Composition-Mole % (wt. %) | | | | |
| $SO_2$ | 19.2 (37.9) | 19.2 (37.9) | 19.2 (37.9) | 19.1 (37.8) |
| $N_2$ | 5.8 (4.9) | 5.8 (4.9) | 5.8 4.9 | 5.7 (4.9) |
| $CO_2$ | 9.6 (13.0) | 9.6 (13.0) | 9.6 (13.0) | 9.6 13.0 |
| $H_2O$ | 42.2 (23.5) | 42.2 (23.5) | 42.2 (23.5) | 42.5 (23.6) |
| Control Air | 23.2 (20.7) | 23.2 (20.7) | 23.2 (20.7) | 23.1 (20.7) |
| Rate-Sft$^3$/hr at 60° F. | 222.1 | 222.4 | 222.5 | 223.0 |
| Dry Gaseous Product Composition-Mole % (wt. %) | | | | |
| $N_2$ | 42.0 (31.5) | 42.3 (31.5) | 39.8 (29.4) | 41.5 (31.0) |
| CO | 0.02 (0.02) | 0.035 (0.02) | 0.02 (0.015) | 0.0 (0.0) |
| $CH_4$ | 0.74 (0.31) | 0.81 (0.35) | 0.21 (0.090) | 0.35 (0.15) |
| $CO_2$ | 51.2 (60.4) | 48.6 (56.8) | 53.2 (61.9) | 52.6 (61.8) |
| $C_2H_4$ | 0.0 (0.0) | 0.0 (0.0) | 0.0 (0.0) | 0.0 (0.0) |
| $C_2H_6$ | 0.0 (0.0) | 0.0 (0.0) | 0.0 (0.0) | 0.0 (0.0) |
| $H_2S$ | 1.3 (1.2) | 1.2 (1.0) | 2.2 (2.0) | 1.4 (1.3) |
| COS | 0.59 (1.0) | 0.89 (1.4) | 1.3 (2.0) | 0.85 (1.3) |
| $CS_2$ | 0.08 (0.2) | 0.13 (0.3) | 0.15 (0.30) | 0.07 (0.14) |
| $H_2$ | 1.0 (0.06) | 1.1 (0.06) | 0.7 (0.037) | 0.72 (0.038) |
| $SO_2$ | 3.1 (5.3) | 5.0 (8.5) | 2.5 (4.2) | 2.5 (4.3) |
| Rate-Sft$^3$/hr at 60° F. | 126.2 | 125.3 | 133.2 | 127.7 |
| Reactor Temperature-°F. | | | | |
| Gas inlet | 1039 | 1023 | 1062 | 1016 |
| ¼ Bed | 1291 | 1305 | 1231 | 1293 |
| ½ Bed | 1092 | 1134 | 1061 | 1118 |
| ¾ Bed | 827 | 779 | 814 | 851 |
| Gas Outlet | 767 | 729 | 800 | 817 |
| Average Reactor Pressure-KPa absolute (psia) | 117 (17.0) | 117 (17.0) | 115 (16.7) | 119 (17.2) |
| Gas Residence Time-seconds [Based on superficial | 13.3 | 13.4 | 13.1 | 13.3 |

|  | Run 3 | Run 4 | Run 5 | Run 6 |
|---|---|---|---|---|
| velocity, average temperature and inlet composition] | | | | |
| Coal Discharge Rate- | | | | |
| cg/s (lb/hr) | 37.8 (3.0) | 32.8 (2.6) | 54.2 (4.3) | 51.7 (4.1) |
| as percent of reactor content/hr | 3.2 | 2.8 | 4.6 | 4.4 |
| Volumetric Expansion-elemental sulfur and moisture-free ratio of gaseous products to feedstock | 0.98 | 0.98 | 1.04 | 1.00 |
| $SO_2$ Conversion (removal)-% | 90.8 | 85.3 | 92.2 | 92.5 |
| Sulfur In Product-as percent of sulfur in Feed | | | | |
| From $H_2S$ | 3.9 | 3.6 | 6.9 | 4.2 |
| From COS | 1.8 | 2.6 | 4.2 | 2.6 |
| From $SO_2$ | 9.2 | 14.7 | 7.8 | 7.5 |
| From $CS_2$ | 0.5 | 0.8 | 0.9 | 0.4 |
| Elemental Sulfur | 84.6 | 78.3 | 80.2 | 85.3 |
| Rate-cg/s (lb/hr) | 45.4 (3.60) | 45.3 (3.60) | 45.4 (3.60) | 45.4 (3.60) |
| Purity of Elemental Sulfur-% | 99.06 | — | 99.61 | 99.33 |

EXAMPLE 3

The effect of using recycled coal with a gas flow rate at 100% of the maximum flow that the pilot is capable of handling was studied in runs 7, 8, 9, and 10. Three consecutive days of operation were completed, with a fourth day of testing after a one day interruption for a run discussed in Example 4, infra.

Testing was begun with the coal bed and hopper charge in the state that prevailed at the completion of run 6. The procedure followed for recycling the spent coal was identical to that described in Example 2. An average of 50% of the coal fed the reactor during runs 7, 8, 9, and 10 was recycled coal. The screened recycled coal contained between 5.0% and 5.3% ash. The following is a summary of the results of runs 7, 8, 9, and 10.

|  | Run 7 | Run 8 | Run 9 | Run 10 |
|---|---|---|---|---|
| Feed Composition-Mole % (wt. %) | | | | |
| $SO_2$ | 21.3 (41.5) | 20.9 (40.9) | 21.0 (41.0) | 20.9 (40.9) |
| $N_2$ | 6.4 (5.4) | 6.3 (5.4) | 6.3 (5.4) | 6.3 (5.4) |
| $CO_2$ | 10.6 (14.3) | 10.5 (14.1) | 10.5 (14.1) | 10.5 (14.1) |
| $H_2O$ | 46.7 (25.6) | 46.1 (25.3) | 46.0 (25.2) | 46.1 (25.3) |
| Control Air | 15.0 (13.2) | 16.2 (14.3) | 16.2 (14.3) | 16.3 (14.3) |
| Rate-Sft$^3$/hr at 60° F. | 401.3 | 407.5 | 406.4 | 407.2 |
| Dry Gaseous Product Composition-Mole % (wt. %) | | | | |
| $N_2$ | 33.9 (24.4) | 33.9 (24.7) | 36.8 (26.7) | 35.4 (25.7) |
| CO | 0.10 (0.068) | 0.0 (0.0) | 0.14 (0.098) | 0.11 (0.081) |
| $CH_4$ | 0.33 (0.14) | 0.69 (0.29) | 0.61 (0.25) | 0.60 (0.25) |
| $CO_2$ | 58.7 (66.4) | 59.4 (68.0) | 54.3 (61.8) | 56.5 (64.4) |
| $C_2H_4$ | 0.0 (0.0) | 0.0 (0.0) | 0.0 (0.0) | 0.0 (0.0) |
| $C_2H_6$ | 0.0 (0.0) | 0.0 (0.0) | 0.0 (0.0) | 0.0 (0.0) |
| $H_2S$ | 1.5 (1.3) | 2.1 (1.9) | 1.2 (1.1) | 1.2 (1.0) |
| COS | 0.77 (1.2) | 0.72 (1.1) | 0.79 (1.2) | 0.53 (0.81) |
| $CS_2$ | 0.14 (0.27) | 0.11 (0.22) | 0.1 (0.22) | 0.07 (0.14) |
| $H_2$ | 0.86 (0.044) | 0.80 (0.043) | 0.91 (0.047) | 1.0 (0.050) |
| $SO_2$ | 3.7 (6.1) | 2.3 (3.8) | 5.2 (8.6) | 4.6 (7.6) |
| Rate-Sft$^3$/hr at 60° F. | 214.2 | 227.4 | 209.5 | 217.8 |
| Reactor Temperature-°F. | | | | |
| Gas inlet | 1064 | 1078 | 1076 | 1079 |
| ¼ Bed | 1460 | 1437 | 1435 | 1427 |
| ½ Bed | 1416 | 1426 | 1394 | 1383 |
| ¾ Bed | 1232 | 1168 | 1123 | 1151 |
| Gas Outlet | 1165 | 1080 | 1020 | 1086 |
| Average Reactor Pressure-KPa absolute (psia) | 137 (19.9) | 136 (19.7) | 114 (16.5) | 108 (15.7) |
| Gas Residence Time-seconds [Based on superficial velocity, average temperature and inlet composition] | 7.3 | 7.3 | 6.2 | 5.8 |
| Coal Discharge Rate- | | | | |
| cg/s (lb/hr) | 26.5 (2.1) | 25.2 (2.0) | 31.5 (2.5) | 55.4 (4.4) |
| as percent of reactor content/hr | 2.2 | 2.1 | 2.7 | 4.7 |
| Volumetric Expansion-elemental sulfur and moisture-free ratio of gaseous products to feedstock | 1.00 | 1.04 | 0.95 | 0.99 |
| $SO_2$ Conversion (removal)-% | 90.7 | 93.9 | 87.1 | 88.2 |

|  | Run 7 | Run 8 | Run 9 | Run 10 |
|---|---|---|---|---|
| Sulfur In Products-as percent of Sulfur in Feed | | | | |
| From $H_2S$ | 3.8 | 5.6 | 2.9 | 3.1 |
| From COS | 1.9 | 1.9 | 1.9 | 1.3 |
| From $SO_2$ | 9.3 | 6.1 | 12.9 | 11.8 |
| From $CS_2$ | 0.7 | 0.6 | 0.5 | 0.4 |
| Elemental Sulfur | 84.3 | 85.8 | 81.8 | 83.4 |
| Rate-cg/s(lb/hr.) | 90.6 (7.19) | 90.6 (7.19) | 90.6 (7.19) | 90.6 (7.19) |
| Purity of Elemental Sulfur-% | — | 99.27 | — | 99.09 |

EXAMPLE 4

The effect of using recycled coal while changing the load from 100% to 50% of the maximum flow that the pilot plant is capable of handling was examined in runs 11, 12, 13, and 14. Two tests, spanning two nonconsecutive days, were run. Reference data at 100% design flow were taken, with process parameters (control air, temperature profile and spent coal rate) then being adjusted for a 50% downturn. After steady state conditions were reestablished, a new set of data were taken. It required from 3 to 4 hours to adjust the process parameters between the different loadings. The coupling of two runs constitute one complete test of response to a change in load. Thus, runs 11 and 12 constitute one complete test, while runs 13 and 14 constitute the second complete test. An average of 50% of the coal fed the reactor during these four runs were recycled coal.

Run 12 produced the highest purity of sulfur found during the program, 99.71%. The ash content in the used coal, at the end of the first and second day of testing, was 5.42% and 6.22%, respectively. As can be seen in the data repeated below, when the load was reduced there was a reduction in the yield of elemental sulfur. Runs 11/12 had sulfur yields of 77.7/73.0%, while runs 13/14 had sulfur yields of 83.1/79.2%. The following is a summary of the test results of runs 11, 12, 13, and 14.

|  | Run 11 | Run 12 | Run 13 | Run 14 |
|---|---|---|---|---|
| Feed Composition-Mole % (wt. %) | | | | |
| $SO_2$ | 20.9 (40.9) | 19.2 (37.9) | 20.9 (40.9) | 19.3 (38.0) |
| $N_2$ | 6.3 (5.4) | 5.7 (4.9) | 6.3 (5.4) | 5.8 (4.9) |
| $CO_2$ | 10.5 (14.1) | 9.6 (13.0) | 10.5 (14.1) | 9.6 (13.0) |
| $H_2O$ | 46.1 (25.3) | 42.4 (23.5) | 46.1 (25.3) | 42.1 (23.4) |
| Control Air | 16.2 (14.3) | 23.1 (20.7) | 16.2 (14.3) | 23.2 (20.7) |
| Rate-Sft$^3$/hr at 60° F. | 407.4 | 222.8 | 407.9 | 221.7 |
| Dry Gaseous Product Composition-Mole % (wt. %) | | | | |
| $N_2$ | 33.6 (24.5) | 37.6 (27.6) | 34.4 (25.0) | 39.5 (28.8) |
| CO | 0.15 (0.11) | 0.38 (0.28) | 0.083 (0.062) | 0.0 (0.0) |
| $CH_4$ | 1.0 (0.42) | 0.35 (0.15) | 0.79 (0.33) | 0.47 (0.20) |
| $CO_2$ | 55.1 (63.2) | 53.2 (61.4) | 57.0 (65.2) | 52.9 (60.7) |
| $C_2H_4$ | 0.0 (0.0) | 0.0 (0.0) | 0.0 (0.0) | 0.0 (0.0) |
| $C_2H_6$ | 0.0 (0.0) | 0.0 (0.0) | 0.0 (0.0) | 0.0 (0.0) |
| $H_2S$ | 2.5 (2.2) | 3.7 (3.3) | 1.3 (1.1) | 0.9 (0.81) |
| COS | 1.5 (2.3) | 0.73 (1.1) | 0.78 (1.2) | 0.43 (0.68) |
| $CS_2$ | 0.17 (0.34) | 0.11 (0.23) | 0.12 (0.24) | 0.08 (0.16) |
| $H_2$ | 2.0 (0.10) | 0.47 (0.025) | 1.4 (0.075) | 0.68 (0.035) |
| $SO_2$ | 4.0 (6.7) | 3.5 (5.9) | 4.1 (6.8) | 5.1 (8.6) |
| Rate-Sft$^3$/hr at 60° F. | 29.5 | 141.0 | 224.1 | 134.2 |
| Gas inlet | 1061 | 1034 | 1068 | 1164 |
| ¼ Bed | 1470 | 1296 | 1448 | 1259 |
| ½ Bed | 1437 | 1183 | 1386 | 1225 |
| ¾ Bed | 1103 | 942 | 1148 | 1026 |
| Gas Outlet | 1020 | 1021 | 1096 | 1065 |
| Average Reactor Pressure-KPa absolute (psia) | 114 (16.5) | 106 (15.4) | 108 (15.7) | 107 (15.5) |
| Gas Residence Time-seconds [Based on superficial velocity, average temperature and inlet composition] | 6.1 | 11.3 | 5.8 | 11.1 |
| Coal Discharge Rate- | | | | |
| cg/s (lb/hr) | 40.3 (3.2) | 42.8 (3.4) | 55.4 (4.4) | 36.5 (2.9) |
| as percent of reactor content/hr | 3.4 | 3.6 | 4.7 | 3.1 |
| Volumetric Expansion-elemental sulfur and moisture-free ratio of gaseous products to feedstock | 1.05 | 1.10 | 1.02 | 1.05 |
| $SO_2$ Conversion(removal)-% | 89.3 | 88.3 | 89.3 | 83.9 |
| Sulfur In Poducts-as pecent of sulfur in Feed | | | | |
| From $H_2S$ | 6.7 | 12.2 | 3.5 | 2.8 |
| From COS | 4.0 | 2.4 | 2.1 | 1.4 |
| From $SO_2$ | 10.7 | 11.7 | 10.7 | 16.1 |
| From $CS_2$ | 0.9 | 0.7 | 0.6 | 0.5 |

-continued

| | Run 11 | Run 12 | Run 13 | Run 14 |
|---|---|---|---|---|
| Elemental Sulfur | 77.7 | 73.0 | 83.1 | 79.2 |
| Rate-cg/s (lb/hr.) | 90.6 (7.19) | 45.4 (3.60) | 90.6 (7.19) | 45.4 (3.60) |
| Purity of Elemental Sulfur-% | — | 99.71 | — | — |

Table 3 summarizes the analyses of elemental sulfur and used coal for most of the test runs.

TABLE 3

SULFUR AND USED COAL ANALYSES

| Example | Run(1) | Sulfur Samples | | Used Coal Samples | |
|---|---|---|---|---|---|
| | | % Sulfur | % Carbon | % Ash(2) | % Volatile Matter |
| 1 | 1 | 97.28 | 0.83 | 7.89 | 3.65 |
|   | 2 | — | — | 5.70 | — |
| 2 | 3 | 99.06 | 0.66 | 5.18 | 3.89 |
|   | 4 | — | — | 4.05 | — |
|   | 5 | 99.61 | 0.25 | 3.65 | 1.78 |
|   | 6 | 99.33 | 0.24 | 5.11 | 2.13 |
| 3 | 7 | — | — | 5.01 | — |
|   | 8 | 99.27 | 0.45 | 5.28 | 3.64 |
|   | 9 | — | — | 5.08 | — |
|   | 10 | 99.09 | 0.61 | 5.02 | — |
| 4 | 12 | 99.71 | 0.18 | 5.42 | 3.62 |
|   | 14 | — | — | 6.22 | 3.59 |

(1)Each day of operation was assigned a run number irrespective of the ability to complete a successful data test.
(2)The coal was screened prior to sampling for Examples 2, 3, and 4. Example 1 samples included fines.

Table 4 summarizes the test results for the various runs.

TABLE 4

Summary of Test Results

| Run | Percent Conversion (Removal of SO$_2$) | Percent Yield Elemental Sulfur as Percent of Sulfur in Feed | Purity of Elemental Sulfur | Amount of Recycled Coal as Percentage of Total Coal Used | Maximum Reactor Temperature °F. |
|---|---|---|---|---|---|
| 1 | 84.4 | 70.0 | 97.28 | 0 | 1303 |
| 2 | 96.7 | 30.8 | — | 0 | 1349 |
| 3 | 90.8 | 84.6 | 99.06 | 99 | 1291 |
| 4 | 85.3 | 78.3 | — | 92 | 1305 |
| 5 | 92.2 | 80.2 | 99.61 | 72 | 1231 |
| 6 | 92.5 | 85.3 | 99.33 | 55 | 1293 |
| 7 | 90.7 | 84.3 | — | 64 | 1460 |
| 8 | 93.9 | 85.8 | 99.27 | 48 | 1437 |
| 9 | 87.1 | 81.8 | — | 46 | 1435 |
| 10 | 88.2 | 83.4 | 99.09 | 42 | 1427 |
| 11 | 89.3 | 77.7 | — | 50 | 1470 |
| 12 | 88.3 | 73.0 | 99.71 | 50 | 1296 |
| 13 | 89.3 | 83.1 | — | 50 | 1448 |
| 14 | 83.9 | 79.2 | — | 50 | 1259 |

As can be seen from Table 4, there is a significant improvement in the yield of elemental sulfur when a mixture of fresh and recycled coal is used. Run 1, which used only fresh coal, had a 70.0% yield of elemental sulfur with an 84.4% conversion of SO$_2$. In comparison, run 4, which used a mixture of fresh and recycled coal, had a 78.3% yield of elemental sulfur with an 85.3% conversion of SO$_2$. Moreover, as can be seen from run 2, when only fresh coal is used there is a substantial decrease in the yield of elemental sulfur when an attempt is made to increase the percent conversion of SO$_2$. In contradistinction, when a mixture of fresh and recycled coal is used the yield of elemental sulfur remains high even as the percent removal of SO$_2$ is increased.

The improved yield of elemental sulfur is apparently attributable to the lower volatile content of recycled coal, as well as to its lower reactivity as a reducing agent. Both of these factors tend to suppress the production of undesired by-products such as H$_2$S, COS, and CS$_2$, thereby leaving more sulfur to be converted to elemental sulfur.

The purity of the elemental sulfur, as can be seen from Table 4, was consistently above 99% when recycled coal was used, as compared to 97.28% with no recycling of the coal. This improvement in purity is attributable to the lower volatile content of recycled coal and to screening of the coal to remove fines.

It will be apparent to those skilled in the art that various modifications and variations can be made in the equipment and overall process described hereinabove without departing from the scope of the present invention.

What is claimed is:

1. A process for the reduction of sulfur dioxide to elemental sulfur comprising introducing steam and a SO$_2$-containing off-gas into a reactor containing a mixture of fresh and recycled coal, wherein the recycled coal constitutes from 30% to 90% of the total coal mixture, and contacting the steam and SO$_2$-containing off-gas with the coal at a temperature sufficient to reduce the SO$_2$ to elemental sulfur.

2. The process of claim 1 wherein the recycled coal constitutes from 50% to 80% of the total coal mixture.

3. The process of claim 1 wherein the coal is gravity fed into the reactor.

4. The process of claim 3 wherein the coal flows counter-current to the flow of steam and SO$_2$-containing off-gas.

5. The process of claim 1 wherein the coal is granular and is subjected to screening to remove fines prior to being introduced into the reactor.

6. The process of claim 5 wherein a No. 6 square sieve size is used.

7. The process of claim 1 wherein the elemental sulfur is removed from the reactor and condensed.

8. The process of claim 1 wherein the minimum reactor temperature ranges from 779° F. to 1232° F. and the maximum reactor temperature ranges from 1231° F. to 1470° F.

9. The process of claim 1 wherein the contact time between the steam and SO$_2$-containing off-gas and the coal ranges from 5.8 to 13.4 seconds.

10. The process of claim 1 wherein the percent removal of SO$_2$ ranges from 85.3% to 93.9%, and the yield of elemental sulfur, as a weight percent of the total sulfur content of the steam and SO$_2$-containing off-gas, ranges from 78.3% to 85.8%.

11. The process of claim 1 wherein the coal used is anthracite coal.

12. A process for the reduction of sulfur dioxide to elemental sulfur comprising introducing steam and a SO$_2$-containing off-gas into a reactor containing a mixture of fresh and recycled coal, wherein the recycled coal constitutes from about 40% to 90% of the total coal mixture, and contacting the steam and SO$_2$-containing off-gas with the coal at a temperature sufficient to reduce the SO$_2$ to elemental sulfur.

13. A process for the reduction of sulfur dioxide to elemental sulfur comprising introducing steam and a SO$_2$-containing off-gas into a reactor containing a mixture of fresh and recycled coal, wherein the recycled coal constitutes from about 42% to 90% of the total coal mixture, and contacting the steam and SO$_2$-containing off-gas with the coal at a temperature sufficient to reduce the SO$_2$ to elemental sulfur.

* * * * *